No. 853,596. PATENTED MAY 14, 1907.
F. D. RANDALL.
DIE FOR CUTTING SCREW THREADS.
APPLICATION FILED FEB. 26, 1906.
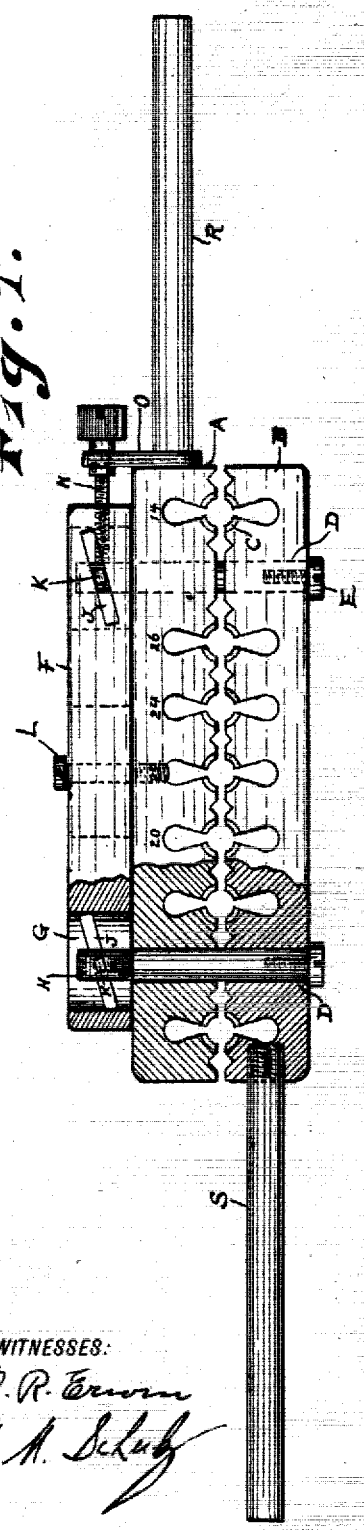
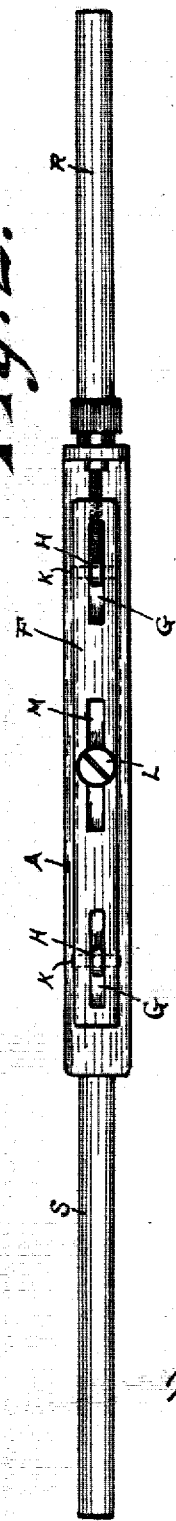

UNITED STATES PATENT OFFICE.

FRANK D. RANDALL, OF WAUPACA, WISCONSIN, ASSIGNOR OF ONE-THIRD TO E. E. BROWNE, OF WAUPACA, WISCONSIN.

DIE FOR CUTTING SCREW-THREADS.

No. 853,596.      Specification of Letters Patent.      Patented May 14, 1907.

Application filed February 26, 1906. Serial No. 303,141.

*To all whom it may concern:*

Be it known that I, FRANK D. RANDALL, a citizen of the United States, residing at Waupaca, county of Waupaca, and State of Wisconsin, have invented new and useful Improvements in Dies for Cutting Screw-Threads, of which the following is a specification.

My invention relates to improvements in "adjustable screw-thread cutting dies".

The object of my invention is to provide a form of construction in which the die members may be accurately adjusted and securely held against variation or displacement during the thread cutting operation.

In the following description reference is had to the accompanying drawings, in which,—

Figure 1 is a plan view of a multiple thread cutting die embodying my invention. Fig. 2 is an edge view of the same showing the slots in the gage members.

Like parts are identified by the same reference characters in both views.

A and B are the die members formed with graduated thread cutters C of any ordinary style. Rods D extend through apertures in the respective die members at right angles to their meeting faces, these rods being provided with heads E engaging the members B. A gage member F is adjusted to the outer surface of the member A and is provided with slots G for the reception of the ends H of the rods D, which are preferably flattened where they extend into the slots G as shown in Fig. 2. Diagonal guide slots or channels J are formed in the slots of the member F at the respective sides of the slots G, and the flattened ends H of the rods D are provided with cross-pins or lateral projections K, which extend into the slots or channels J. The slots or channels J extend longitudinally in the member F with one end approaching and the other receding from the member A. The walls of the slots form angular bearing surfaces for the projections K.

The members F and A are connected by a bolt L, which extends through a slot M in the member F and into a screw threaded aperture in the member A, whereby the member F is permitted to move longitudinally along the member A.

An adjusting screw N swiveled to a bracket O at one end of the member A has threaded engagement with the gage member F, so that by turning the screw N the member F will be moved longitudinally, thus causing the member A to approach or recede from the member B in correspondence with the position of the pins K in the slots J.

The device is provided with the usual handles R and S, which may be attached at any suitable point to either one of the members A or B.

The members A and B are provided with gage marks as shown in Fig. 1, indicating the pitch or dimensions of the thread cutters C.

Having thus described my invention what I claim as new and desire to secure by Letters Patent is,—

1. In a device of the described class the combination of a pair of apertured thread cutting die members, headed rods slidingly mounted in and fitting the apertures in the die members, an adjustable gage member having diagonal bearing surfaces movably engaging said rods, and means for adjusting the gage member at an angle to the axis of said rods to separate the die members or cause them to approach each other.

2. In a device of the described class, the combination of a pair of thread cutting die members provided with rod receiving apertures; connecting guide rods slidingly mounted in and fitting said apertures; and means, common to both rods, for simultaneously adjusting the die members at both ends with reference to each other.

3. In a device of the described class, the combination of a pair of thread cutting die members; headed rods extending through the members and provided with lateral projections near their unheaded ends; a gage member movably mounted on one of the die members and provided with slots receiving said rods; and diagonal guide ways receiving said lateral projections.

4. In a device of the described class, the combination of a set of thread cutting dies; headed rods extending through the members and provided with lateral projections near their unheaded ends; a gage member movably mounted on one of the die members and provided with slots receiving said bolts; and diagonal guide ways receiving said lateral projections; together with an adjusting screw having swiveled connection with one of the die members and threaded connection with the gage member.

In testimony whereof I affix my signature in the presence of two witnesses.

FRANK D. RANDALL.

Witnesses:
CLARENCE H. TRUESDELL,
WILLIAM E. FISHER.